United States Patent
Ross (10) Patent No.: US 11,416,386 B2
(45) Date of Patent: Aug. 16, 2022

(54) BEHAVIOR-BASED COMPARISON OF SOFTWARE

(71) Applicant: Curtail, Inc., Anaheim, CA (US)

(72) Inventor: Robert F. Ross, Santa Ana, CA (US)

(73) Assignee: Curtail, Inc., Anaheim, CA (US)

( * ) Notice: Subject to any disclaimer, the term of this patent is extended or adjusted under 35 U.S.C. 154(b) by 0 days.

(21) Appl. No.: 17/107,499

(22) Filed: Nov. 30, 2020

(65) Prior Publication Data

US 2021/0165731 A1   Jun. 3, 2021

Related U.S. Application Data (60) Provisional application No. 62/942,609, filed on Dec. 2, 2019.

(51) Int. Cl.
| | |
|---|---|
| G06F 11/36 | (2006.01) |
| G06F 8/71 | (2018.01) |
| H04L 9/32 | (2006.01) |
| G06F 9/451 | (2018.01) |

(52) U.S. Cl.
CPC .......... *G06F 11/3696* (2013.01); *G06F 8/71* (2013.01); *G06F 11/3688* (2013.01); *G06F 11/3692* (2013.01); *G06F 9/453* (2018.02); *H04L 9/3213* (2013.01)

(58) Field of Classification Search
CPC ...... H04L 9/3213; G06F 8/71; G06F 11/3688; G06F 11/3692; G06F 11/3696; G06F 9/453
See application file for complete search history.

(56) References Cited

U.S. PATENT DOCUMENTS

| | | |
|---|---|---|
| 8,239,836 B1 | 8/2012 | Franz |
| 8,990,778 B1 | 3/2015 | Allocca |
| 9,117,079 B1 | 8/2015 | Huang |
| 10,909,028 B1 | 2/2021 | Khanduri |
| 2008/0313498 A1 | 12/2008 | Jennings |
| 2013/0041972 A1* | 2/2013 | Field ............... H04L 29/08729 709/213 |
| 2013/0166520 A1 | 6/2013 | Vass |
| 2013/0275971 A1* | 10/2013 | Kruglick ............ G06F 11/3442 718/1 |
| 2014/0279838 A1 | 9/2014 | Tsirogiannis |
| 2014/0310327 A1* | 10/2014 | Yip ........................ G06F 9/52 709/201 |
| 2017/0270176 A1 | 9/2017 | Horowitz |
| 2017/0331829 A1 | 11/2017 | Lander |

(Continued)

FOREIGN PATENT DOCUMENTS

EP   3131014   2/2017

OTHER PUBLICATIONS

Github, OpenDiffy/DIffy, Release 19.8.28.0, Aug. 28, 2019.

(Continued)

*Primary Examiner* — Marina Lee
(74) *Attorney, Agent, or Firm* — Van Pelt, Yi & James LLP (57) ABSTRACT

A network message is received for a first implementation. The network message is replicated for a second implementation. A first behavior from the first implementation is compared with a second behavior from the second implementation. A defect action is determined based at least in part on results of said comparison.

19 Claims, 8 Drawing Sheets

(56) References Cited

U.S. PATENT DOCUMENTS

2020/0106767 A1* 4/2020 Robinson .............. H04L 67/306

OTHER PUBLICATIONS

GoReplay, GoReplay—Test your System with Real Data, Mar. 16, 2017, retrieved from: https://web.archive.org/web/20170316113231if_/https://goreplay.org/.
Safedeploy, CI/CD Tool, DevOps Tool, Blue Green Canary Deploys—Safe Deploy, Oct. 20, 2020, retrieved from: https://web.archive.org/web/20201020033913/https://www.safedeploy.net/.
Sn126, Sn126 Home | Introducing Isotope, Sep. 19, 2020, retrieved from: https://webarchive.org/web/20200919131809/https://sn126.com/.
Professionalqa.com, Active and Passive Testing, Jul. 15, 2019.

* cited by examiner

Found 7 differences  Show: ☑ 4 missing properties  ☑ 3 unequal values

```
1.  {
2.    "MIMEMaP": {
3.      "application/json": {
4.        "CompoundID": [
5.          "^[A-Za-z]+([^:]{1,20}):(.{1,32})$",
6.          "^[A-Za-z]+:\\(([^:]*)])$",
7.          "^[A-Za-z]{1,20}:\\(([A-Za-z0-9_.]+)]([^:]{0,20}]{.{1,64})$",
8.          "^TEMP_([0-9A-Za-z]{1,20})$",
9.          "^(t\\.[0-9A-Z]{1,4}):([0-9A-Fa-f]{31,32})$",
10.       ],
11.       "IDPattern": [
12.         "^[0-9A-Fa-f]{31,32}$",
13.         "^[0-9a-fA-F]{8}-[0-9a-fA-F]{4}-[0-9a-fA-F]{4}-
14.         "^[0-9]{40,80}$",
15.         "^U-[0-9]{40,80}$",
16.         "[A-Z_]{1,32}[0-9A-F]{30,35}$",
17.         "^[A-Z0-9]{25,30}$"
18.       ],
19.       "Protocol": "JSON"
20.     }
21.   },
22.   "PerfMetrics": true,
23.   "Protocol": "HTTP"
24. }
25.
```

1 of 6  Missing element ⑤ from the array on the left side

```
1.  {
2.    "MIMEMaP": {
3.      "application/json": {
4.        "CompoundID": [
5.          "^[A-Za-z]+([^:]{1,20}):(.{1,32})$",
6.          "^[A-Za-z]+:\\(([^:]{0,32})$",
7.          "^[A-Za-z]{1,20}:\\(([A-Za-z0-9_.]+)]([^:]{0,20}]{.{1,64})$",
8.          "^TEMP_([0-9A-Za-z]{1,20})$",
9.          "^(t\\.[0-9A-Fa-f]{31,32})$",
10.         "^(t\\.[0-9A-Z]{1,4}):([A-Za-z0-9_]+)$",
11.         "^(t\\.[0-9A-Z]{1,4}]).([A-Za-z0-9]{25,30}):([A-Za-z0-9]{25,30}",
12.         "^\\"(TENANT[\\"]*)\\",\\"([^\\"]*)\\"$",
13.         "^(t\\.[0-9A-Z]{1,4}]).([A-Za-z0-9]{25,30})$"
14.       ],
15.       "IDPattern": [
16.         "^[0-9A-Fa-f]{31,32}$",
17.         "^[0-9a-fA-F]{8}-[0-9a-fA-F]{4}-[0-9a-fA-F]{4}-
18.         "^[0-9]{40,79}$",
19.         "^U-[0-9]{40,80}$",
20.         "^[A-Z_]{1,34}[0-9A-F]{30,35}$",
21.         "^[A-Z0-9]{25,30}$"
22.       ],
23.       "Protocol": "JSON"
24.     }
25.   },
26.   "PerfMetrics": true,
27.   "Protocol": "HTTP"
28. }
29.
```

BEHAVIOR-BASED COMPARISON OF SOFTWARE

CROSS REFERENCE TO OTHER APPLICATIONS

This application claims priority to U.S. Provisional Patent Application No. 62/942,609 entitled BEHAVIOR BASED COMPARISON OF SOFTWARE filed Dec. 2, 2019 which is incorporated herein by reference for all purposes.

BACKGROUND OF THE INVENTION

Upgrading services is an essential part of software application development. Once users have started using a service, the developers may need to upgrade the service to provide functionality and/or security improvements. If a developer launches an upgraded service and it breaks compatibility with one or more users, affected users may not be satisfied with the quality of the service or be a victim to a security breach.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In modern environments, updates to software may be made more frequently than in the past. Typically, software is tested by generating test data, inputs, scripts, and so forth, which may be costly and time-consuming and which may not fully test software in all dimensions in which the software may be used in the real world/production environment. Another traditional method is to use a canary release in production by launching it for a small percentage of users and seeing if it behaves in a defective manner/crashes for them.

Behavior-based comparison of software is disclosed. In one embodiment, the behavior of a first version/instance/implementation of software, for example an application, is compared to corresponding behavior of a second version/instance/implementation. For example, two differing major release versions such as version 1.0 and version 2.0 may be run in parallel. This may include providing the same inputs in parallel including the same input data and/or same input commands, and may include appropriate translation/mapping/ordering. The corresponding behavior of the two versions is compared.

In one embodiment, an updated version of software may be run in parallel with a previously released version, such as one currently running in a production environment. As the production version is used, for example by end users, the same end user inputs are provided to the newer version being tested, and the output provided by the respective versions is compared. Differences between the two versions are identified. Behaviors, including outputs, auxiliary responses, or other responses, between the updated version being tested and the production version may be flagged for analysis to determine whether the differences are expected or instead reflect a bug or other defect. An end user may not be made aware that their inputs are being fed to the updated version and may perceive only that they are interacting with the production version.

Unlike traditional mirroring systems that may ignore one or more responses from an application, the behavior-based comparison as disclosed: takes traffic for a primary system; parses the traffic intelligently by translating/updating it so it makes sense for both the primary system and a secondary system; and processes responses from the primary system and a secondary system for comparison to identify any changes or differences, to interpret regression/defects. Also, unlike traditional mirroring systems, logs or other secondary sources are not the sole source for analysis.

Unlike traditional user scripting, behavior-based comparison leverages a deeper/richer understanding of request/response protocols and provides an apples-to-apples comparison for regression purposes. Unlike traditional service mocking, for example Service V, which virtualizes services to send fake/dummy responses, behavior-based comparison uses live customer data with a production environment to compare for regression purposes.

Figure 1:
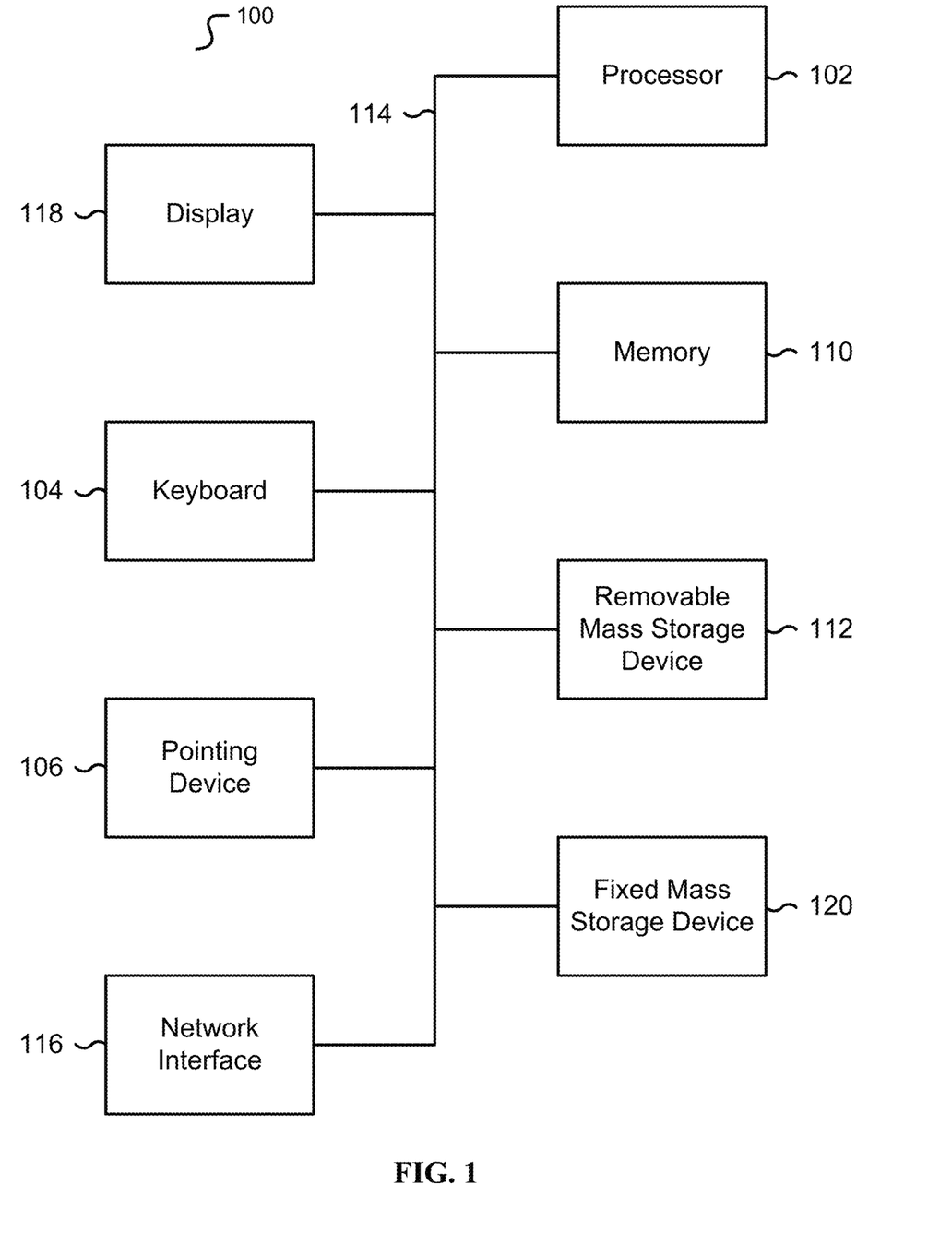
FIG. 1 is a functional diagram illustrating a programmed computer/server system for behavior-based comparison of software in accordance with some embodiments.

FIG. 1 is a functional diagram illustrating a programmed computer/server system for behavior-based comparison of software in accordance with some embodiments. As shown, FIG. 1 provides a functional diagram of a general-purpose computer system programmed to provide behavior-based comparison of software in accordance with some embodiments. As will be apparent, other computer system architectures and configurations may be used for behavior-based comparison of software.

Computer system 100, which includes various subsystems as described below, includes at least one microprocessor subsystem, also referred to as a processor or a central processing unit ("CPU") (102). For example, processor (102) can be implemented by a single-chip processor or by multiple cores and/or processors. In some embodiments, processor (102) is a general-purpose digital processor that controls the operation of the computer system 100. Using instructions retrieved from memory (110), the processor (102) controls the reception and manipulation of input data, and the output and display of data on output devices, for example display and graphics processing unit (GPU) (118).

Processor (102) is coupled bi-directionally with memory (110), which can include a first primary storage, typically a random-access memory ("RAM"), and a second primary storage area, typically a read-only memory ("ROM"). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor (102). Also as is well known in the art, primary storage typically includes basic operating instructions, program code, data, and objects used by the processor (102) to perform its functions, for example programmed instructions. For example, primary storage devices (110) can include any suitable computer-readable storage media, described below, depending on whether, for example, data access needs to be bi-directional or uni-directional. For example, processor (102) can also directly and very rapidly retrieve and store frequently needed data in a cache memory, not shown. The processor (102) may also include a coprocessor (not shown) as a supplemental processing component to aid the processor and/or memory (110).

A removable mass storage device (112) provides additional data storage capacity for the computer system 100, and is coupled either bi-directionally (read/write) or uni-directionally (read only) to processor (102). For example, storage (112) can also include computer-readable media such as flash memory, portable mass storage devices, holographic storage devices, magnetic devices, magneto-optical devices, optical devices, and other storage devices. A fixed mass storage (120) can also, for example, provide additional data storage capacity. One example of mass storage (120) is an eMMC or microSD device. In one embodiment, mass storage (120) is a solid-state drive connected by a bus (114). Mass storages (112), (120) generally store additional programming instructions, data, and the like that typically are not in active use by the processor (102). It will be appreciated that the information retained within mass storages (112), (120) can be incorporated, if needed, in standard fashion as part of primary storage (110), for example RAM, as virtual memory.

In addition to providing processor (102) access to storage subsystems, bus (114) can be used to provide access to other subsystems and devices as well. As shown, these can include a display monitor (118), a communication interface (116), a touch (or physical) keyboard (104), and one or more auxiliary input/output devices (106) including an audio interface, a sound card, microphone, audio port, audio recording device, audio card, speakers, a touch (or pointing) device, and/or other subsystems as needed. Besides a touch screen and/or capacitive touch interface, the auxiliary device (106) can be a mouse, stylus, track ball, or tablet, and is useful for interacting with a graphical user interface.

The communication interface (116) allows processor (102) to be coupled to another computer, computer network, or telecommunications network using a network connection as shown. For example, through the communication interface (116), the processor (102) can receive information, for example data objects or program instructions, from another network, or output information to another network in the course of performing method/process steps. Information, often represented as a sequence of instructions to be executed on a processor, can be received from and outputted to another network. An interface card or similar device and appropriate software implemented by, for example executed/performed on, processor (102) can be used to connect the computer system 100 to an external network and transfer data according to standard protocols. For example, various process embodiments disclosed herein can be executed on processor (102), or can be performed across a network such as the Internet, intranet networks, or local area networks, in conjunction with a remote processor that shares a portion of the processing. Throughout this specification, "network" refers to any interconnection between computer components including the Internet, Bluetooth, WiFi, 3G, 4G, 4GLTE, GSM, Ethernet, TCP/IP, intranet, local-area network ("LAN"), home-area network ("HAN"), serial connection, parallel connection, wide-area network ("WAN"), Fibre Channel, PCI/PCI-X, AGP, VLbus, PCI Express, Expresscard, Infiniband, ACCESS.bus, Wireless LAN, HomePNA, Optical Fibre, G.hn, infrared network, satellite network, microwave network, cellular network, virtual private network ("VPN"), Universal Serial Bus ("USB"), FireWire, Serial ATA, 1-Wire, UNI/O, or any form of connecting homogenous, heterogeneous systems and/or groups of systems together. Additional mass storage devices, not shown, can also be connected to processor (102) through communication interface (116).

An auxiliary I/O device interface, not shown, can be used in conjunction with computer system 100. The auxiliary I/O device interface can include general and customized interfaces that allow the processor (102) to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: flash media such as NAND flash, eMMC, SD, compact flash; magnetic media such as hard disks, floppy disks, and magnetic tape; optical media such as CD-ROM disks; magneto-optical media such as optical disks; and specially configured hardware devices such as application-specific integrated circuits ("ASIC"s), programmable logic devices ("PLD"s), and ROM and RAM devices. Examples of program code include both machine code, as produced, for example, by a compiler, or files containing higher level code, for example a script, that can be executed using an interpreter.

The computer/server system shown in FIG. 1 is but an example of a computer system suitable for use with the various embodiments disclosed herein. Other computer systems suitable for such use can include additional or fewer subsystems. In addition, bus (114) is illustrative of any interconnection scheme serving to link the subsystems. Other computer architectures having different configurations of subsystems may also be utilized.

Figure 2A:
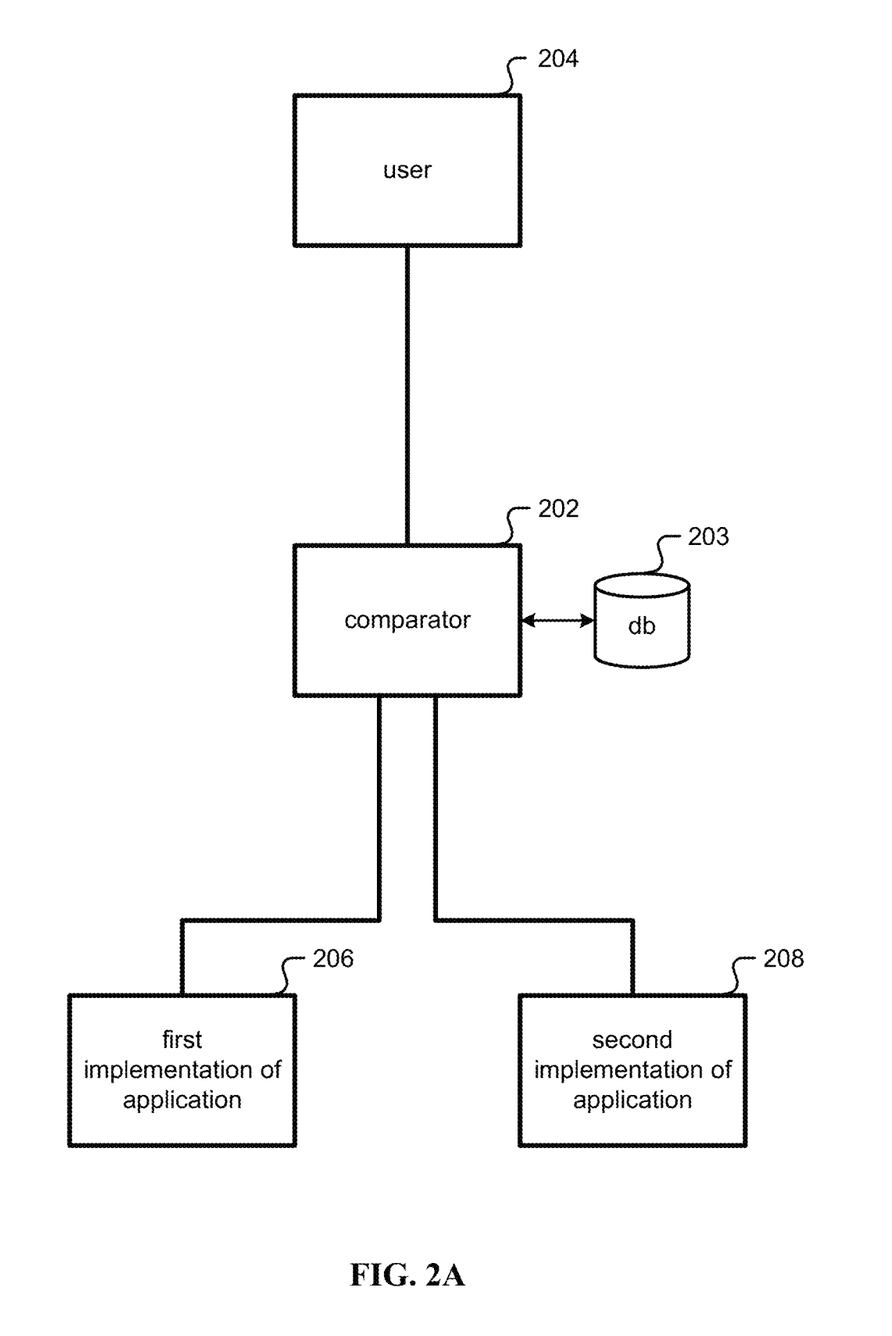
FIG. 2A is a block diagram illustrating an embodiment of a system for active mode comparison.

FIG. 2A is a block diagram illustrating an embodiment of a system for active mode comparison. In one embodiment, the comparator (202) is a physical and/or virtual server or servers comprising a programmed computer/server as shown in FIG. 1.

Comparator (202) is coupled, usually via a network, to a comparator database (203), a user (204), and at least two implementations of software, for example a first version/instance/implementation (206) and a second version/instance/implementation (208) of an application. In some instances, not shown, a load balancer may be used between user (204) and the comparator (202).

The comparator (202) may act as a dynamic gateway or "traffic cop", directing and translating requests where needed in order to keep the two or more versions of software (206), (208), in sync with each other. The term "active mode" is used herein to refer to a configuration when the comparator (202) is placed in-line and acts as a "proxy", where live or other network traffic flows through between a user (204) and a production instance (206), for example allowing the comparator (202) to modify messages and/or intercept encrypted connections, such as TLS connections. The comparator (202) may process and analyze this data traffic and then pass the traffic in lockstep to other instances, for example a release candidate version (208) to monitor corresponding responses. The database and/or configuration document (203) may be used to assist in mapping requests and responses for the comparator (202), for example a JSON document.

This side-by-side comparison with inline monitoring may be well-suited for quality assurance cases. A developer may run the trusted/production version (206) and the release candidate (208) side-by-side and the comparator (202) engine may process the comparisons actively inline. In one embodiment, the comparator (202) also takes care of any duplication of data. In one embodiment, the comparator (202) may monitor real customer data, while customers (204) may see only responses from the production system (206). The information/comparison may then be used to identify any necessary changes in the source code or to automatically perform an upgrade if the comparison testing from comparator (202) does not indicate any unexpected differences. This may be a deployment option for developers and QA staff, right up to release, who may set up and look at side-by-side versions inline.

Figure 2B:
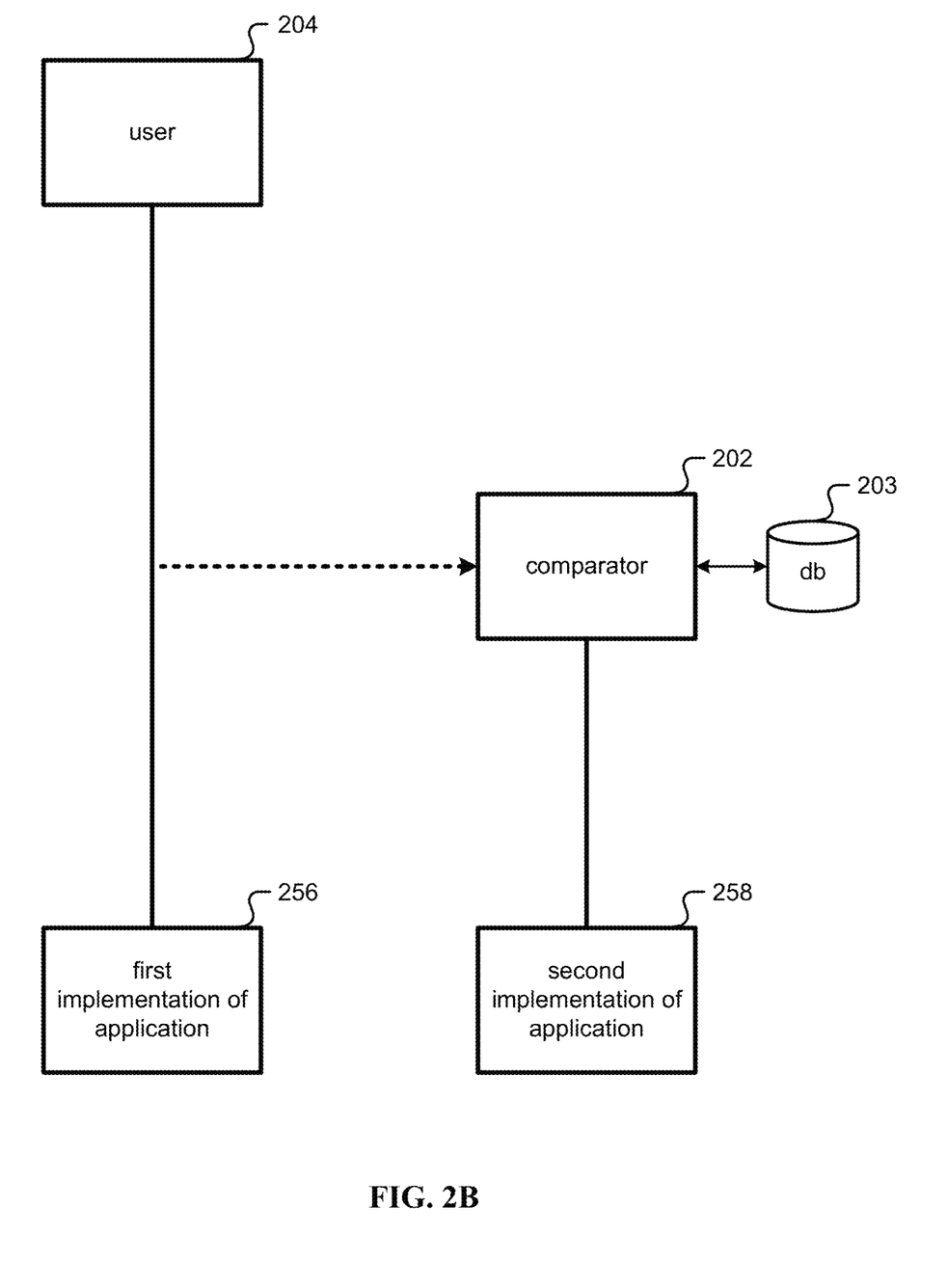
FIG. 2B is a block diagram illustrating an embodiment of a system for passive mode comparison.

FIG. 2B is a block diagram illustrating an embodiment of a system for passive mode comparison. In one embodiment, the comparator (202) is a physical and/or virtual server or servers comprising a programmed computer/server as shown in FIG. 1, and may be the same comparator (202) as shown in FIG. 2A.

Comparator (202) is coupled, usually via a network, to a comparator database/configuration document (203), which may be the same database shown in FIG. 2A. A user (204) is coupled, usually via a network, to a first version/instance/implementation (256) of an application. In some instances, not shown, a load balancer may be used between user (204) and the first version (256). The comparator (202) passively monitors or "taps" the network, for example as a "sniffer", between user (204) and first version (256), shown as a dotted line in FIG. 2B. The comparator (202) is also coupled, usually via a network, to a second version/instance/implementation (258) of the application. One advantage of a passive mode as shown in FIG. 2B is that in the event the comparator (202) fails, the behavioral comparison is not in the line of failure and does not impact user experience. One advantage for active mode as shown in FIG. 2A, is that the comparator (202) may "react" in the event a network security or other alert is found, the comparator (202) may directly shut off the user (204).

When operating in a passive mode, comparator (202) monitors/taps into existing traffic between a user (204) and a primary server (256) and then duplicates the same traffic to one or more servers (258) under test. The database (203) may be used to assist in mapping requests and responses for the comparator (202).

Depending on network configuration or use case, either active mode as shown in FIG. 2A or passive mode as shown in FIG. 2B may be most suitable. Having the option for comparator (202) to use either mode allows for configuration flexibility.

In one embodiment, proper ordering of network messages in passive mode is performed to ensure that the meaning of each message is unchanged and that the behavior of compared systems is comparable. For each message, this includes determining a set of previous messages with which this message "interferes" with, meaning that the relative ordering of the two messages is preserved. An example of why ordering is important is that two users may access the same bank account, and request a transfer to empty the bank account to the user's personal account. Which user succeeds will be the user that is ordered first, and exchanging order will not result in the same outcome.

The definition of message interference depends on the specific protocol in question. Saying two messages interfere is equivalent to saying that exchanging their order does not result in the same outcome. This ordering applies to both request and response messages and across multiple concurrent parallel connections between the same services. This ordering may be defined either as a total ordering, for example represented by some ordered list, or a partial ordering, for example represented by a directed graph. Put another way, through a deeper understanding of the underlying logic, partial ordering may preserve messages where ordering is important, such as the example of the emptying of the bank account above, and relax ordering where it does not interfere.

An advantage of partial ordering over total ordering is that improves parallelism in the comparator (202) and improves efficiency for processing, memory, and/or network resource utilization. For example, if there are hundreds of bank users that do not have shared bank accounts, a partial ordering may be able to load up parallelism without any implication of interference. On the other hand, a total ordering will need to run the hundreds of bank users' messages in serial yet still be safe from interference.

Each message may have ordering dependencies either based on global state, that is external persistence such as databases or file systems, or connection state, for example a database operation may require that it be sent on a connection that has sent previous messages that began a transaction and performed related queries.

When all previous messages upon which a message depends globally have been processed, including those that establish the appropriate connection state, then the message may be handled by transmitting a properly translated form of the message to the appropriate connection.

In one embodiment, two systems are compared with passive mode deployments where the first system (256) is the behavior seen by user (204). The response triggered by observed differences, described as anomalous behavior or defective behavior herein, is reporting information about the protocol messages, fields, and/or values that differ along with optionally capturing performance and packet capture data of the exchanges. In one embodiment, ID mapping, passive mode deployments, and/or support for protocols such as HTTP, Redis, MySQL, and PostgreSQL are provided. In one embodiment, the two ordering definitions described above are implemented using distributed consensus, for example using Paxos. In one embodiment, determining comprises using consensus protocols with extra votes for ordering for the primary application (206).

Improvements by using Behavioral Comparison. Improvements that a comparator (202) brings over traditional techniques include detection, recording, and reporting any anomalous application behavior among different versions of software in real time. Another improvement is that using a comparator (202) does not necessarily require any scripted tests to be written or developed; instead, behavioral comparison provides devops and release teams with an automated tool for evaluating release candidate behavior against real, production traffic before going live.

Thus, operations teams, developers, and/or security personnel may see differences readily and accept or fix a release candidate to prevent the need for costly rollbacks. Testing with an intelligent comparison engine (202) does not disrupt the end user (204) experience. The comparative analysis from comparator (202) may show both expected and unexpected behavior changes to validate previous fixes and upgrades, thus improving operational efficiency and quality at any stage of the Software Development Life Cycle (SDLC).

For example, in FIG. 2A a release candidate (208)/Version 2 is placed into a staging environment. As opposed to scripted, or simulated data, actual production traffic between user (204) and active software (206)/Version 1 currently live in production is used, and the same traffic is sent in near-lockstep to the release candidate (208).

The advantage of such a predictive approach is that existing users (204) see only their requests continuing to go to the production software (206) and are unaware that their traffic is sent additionally to a secondary release candidate (208) under test. Behavioral comparison thus has the advantage of reducing the incidence of expensive rollbacks, since defects may be identified prior to product release. It has been shown that rollbacks are expensive and that the costs associated with correcting software defects in production are up to 640 times more expensive than prior to release.

This use of real-world traffic may uncover issues in areas of functionality where traditional testing technologies fail. Unlike traditional testing methods, which only detect known or foreseen defects, behavioral comparison may also find unknown and unforeseen defects by comparing behavior between software versions (206), (208) with the same production traffic inputs at the same time. The analysis provided by comparator (202) enables devops teams to predict whether a release candidate (208) is ready to go live. While traditional testing methods are based on simulated or scripted discrete requests and responses, the unique holistic approach of behavioral comparison identifies "zero-day" defects or previously unknown, uncategorized defects and bugs.

Code defects and bugs may also introduce security vulnerabilities. It has been estimated that 90 percent of reported security incidents result from exploits against defects in the design or coding of software. Behavioral comparison software thus is an improvement over traditional testing by better preventing software bugs or flaws, vital to the availability and security of digital business.

Deep Protocol Analysis. In practice, defects and/or flaws may be introduced into an application when various subsystems under development are integrated, especially if multiple teams and multiple subsystems are involved and/or as modern architectures like microservices add complexity.

The capability to compare version behaviors while running in "lockstep" provides additional insight and predictability of the application in production, capturing at least part of the complex communications between multiple systems. As referred to herein, lockstep is a technique of running each version of an application at the same sequence/state synchronously: starting the compared applications with matching state; sending network messages to the release candidate (208) to recreate identical state changes to those generated in the monitored software (206); and/or at any particular time the internal states of the two application versions (206), (208) are kept semantically equivalent. A comparator (202) may provide a systems-level understanding of the software versions by looking deeper into protocols to compare and analyze software responses.

This level of application behavioral analysis is based at least in part on comparing the behavior of two or more instances of an application running together in lockstep. Each instance of the application as shown in (206), (208) in FIG. 2A, or as shown in (256), (258) in FIG. 2B, under review is sent "digital twin" requests, and the comparator (202) compares the respective responses for differences. As referred to herein, a digital twin request is a request that is substantively similar to provide each version of an application an opportunity to provide a substantively similar response. That is, in other contexts such as testing mechanical engineering, a "digital twin" refers to a simulation of behavior of a real-world system. In this case a "digital twin" as referred to herein is the possibility of testing a release candidate (208), (258) by comparing with live production environment traffic, providing a test of how the release candidate might behave in the real world without taking the full risks of failure in production.

The comparator (202) provides a dynamic application "digital twin" that improves a developer's effort to reduce bugs or unwanted behavior in production that results in business disruption. This comparison is done in a more intelligent way, and may have developer level insight to parse differences in responses. Differences are described based at least in part on rule systems to highlight protocol elements that are more important for comparison purposes/defect detection, and/or highlight protocol elements that are less important. This in turn permits filtering of responses and/or response comparison. The attributes, parameters, and session or instance-specific values are mapped, and are used to highlight unexpected behavioral differences at a high-level system view as well as at a granular level. In one embodiment, a developer/user may describe in machine-readable format what differences are to be expected, so that differences outside those expected are reported as a defect.

Typically, a developer knows what changes they are intending to introduce in a new software version. These changes may be described in terms of the network protocols and message elements that are changed. For example, a developer may intentionally change a particular API request path so that the JSON body in the response now has an additional field that was not previously present. Specific rules may be stored in the comparator database (203) that may describe these changes in terms of request paths, network protocols, data formats, and specific locations within document bodies. Each rule of this format describes a single change that comparator (202) may recognize when it is seen with test traffic. Using these rules, the product may filter the identified differences into categories based on next steps to be taken. Issues may be genuinely unexpected and need further investigation, may be an intended change that does not require further action, or may be a known defect that is being tracked but has already been triaged.

These mappings may be simple HTTP headers or a deep and complex JSON, XML, HTML, and/or other document type mapping. For instance, with data that is being passed to or from APIs, the disclosed technique parses in-depth requests as part of monitoring the application's behavior and provides precision in identifying where behavioral differences are encountered. The rules developed may also establish when it is appropriate to apply mapping logic. Thus, rules may include recognizing requests where a mapping may happen, location in response bodies for example XPath in XML and/or JSON pointers in JSON.

In one embodiment, rules recognize IDs across all locations, for example 64 bytes of all-numeric and uppercase characters in a string may be recognizes as an ID. Thus, the rules allow detailed granular information about the full parsing as well as context/description on when to apply the logic. In one embodiment, responses, actions, reactions, and/or commits as a result of user requests and/or responses are analyzed so that the primary (206) application performs the response/action/commit while other (208) applications are prevented from repeating the operation. For example, if a user (204) is requesting money be sent, even with multiple banking applications, money will only be sent once using primary (206) application, not another time from other (208) applications.

In one embodiment, the comparator (202) understands protocols at a "deep" level. Examples of basic protocols understood are TCP and HTTP. Examples of application/network/web service protocols are a collection of MIME types. The comparator (202) thus supports web services by supporting a wide variety of MIME types and/or document types, including XML, JSON, HTML, and plaintext. For each MIME/document type the comparator (202) can parse the documents and refer to locations within the documents. A developer may then configure the comparator (202) based on what they have chosen to use as the document structures.

In one embodiment, a developer manually sets up rules for the dynamic mapping of identifiers. Initially, this may be done by running two of the same versions of the same application so there are no expected differences between the instances. This initial run may reveal where identifiers are, as there are no other functional differences besides its unique IDs and/or non-deterministic fields. This revelation may be used at least in part to determine the rules and/or configuration for the comparator (202).

In one embodiment, a user interface ("UI") wizard is provided for partially or fully automatically determining recommendations on rules for dynamically mapping identifiers associated with the network message, using for example the same technique described above in running two of the same versions of the same application. In one embodiment, the configuration/mapping may be described in terms of a database and/or configuration document (203), for example a JSON configuration document. In the event an application uses XML, the configuration of which XML, fields in documents are IDs is performed by putting the XPath of those fields in the appropriate place in the JSON configuration document.

In one embodiment, a UI is provided to enable a capture and replay facility for offline reproduceable test cases. For example, the comparator (202) may record timestamped requests and responses from a user (204) between a version 1.0 (206) and version 2.0 (208) application, for future replay when a version 2.0 (206) and version 2.1 (208) is available. Replay of packet capture data may help developers find defects/bugs early. The developers may simply perform a network packet capture of the test traffic of interest against a trusted software instance (206), including real customer data. The captured traffic may then be replayed to the release candidate (208) using comparator (202). Any differences may indicate problems with the release candidate (208) as well as identifying known changes that have been introduced intentionally as part of the new software upgrade.

In one embodiment, the comparator (202) stores packet captures in the database (203) of interactions between a user (204) and application versions (206), (208), (256), (258). These packet captures may be in a common format such as PCAPNG to allow easy interoperability with other packet capture tools. For replay, the comparator (202) may read a packet capture and extract a specific network flow or flows (for example a specific TCP/IP connection), treating the two ends of the network flow as the user (204) and first implementation (256) of a passive comparison. As described herein, this may result in the requests from the user (204) being sent to the second implementation (258) and having the corresponding response compared between the first implementation in the packet capture (256) and the second implementation provided by the developer (258). These comparison results may then be stored in the comparator database (203).

Figure 3A:
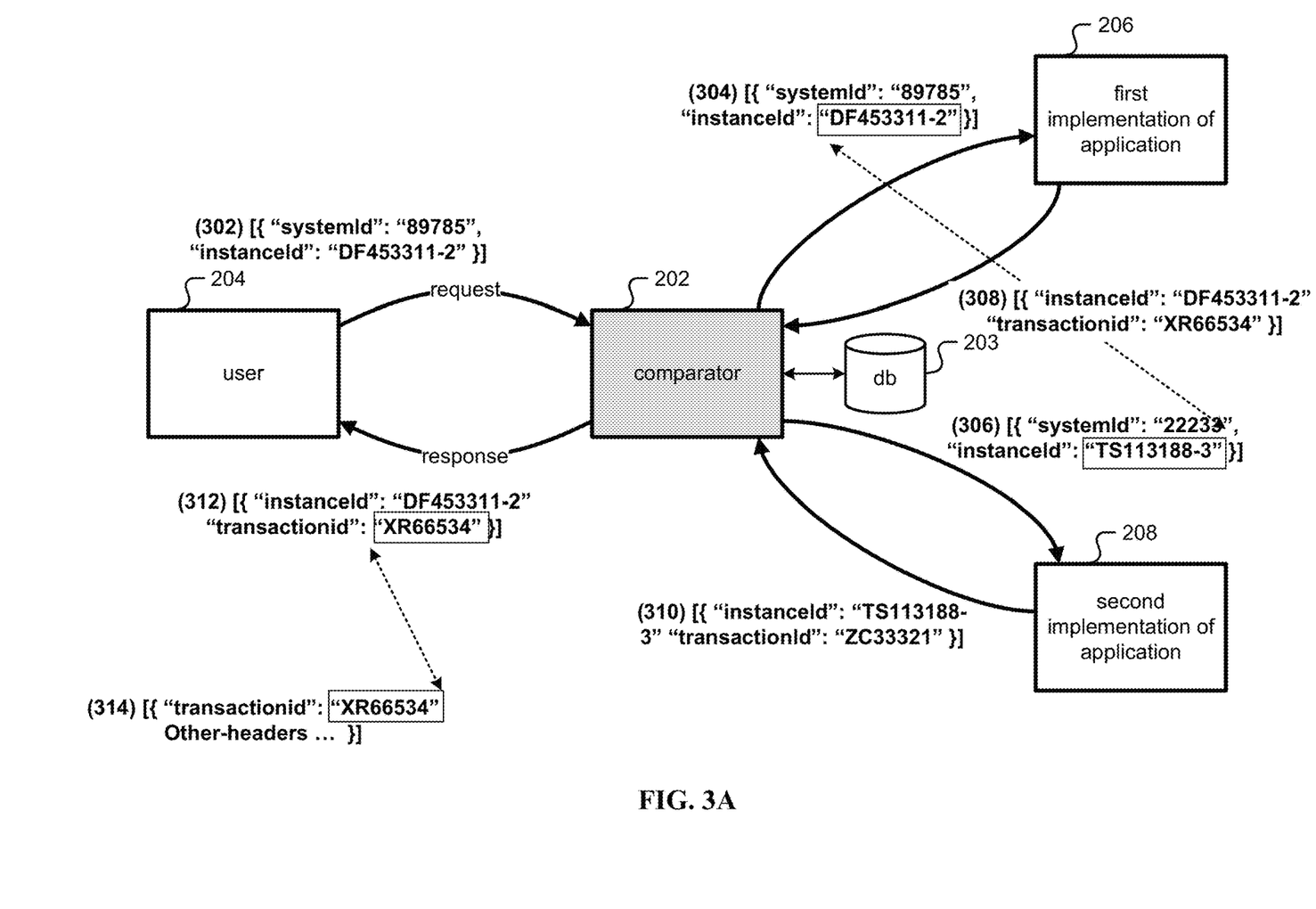
FIG. 3A is a block diagram illustrating an embodiment of a system for identifier mapping.

FIG. 3A is a block diagram illustrating an embodiment of a system for identifier mapping. Without limitation, for clarity mapping is shown in FIG. 3A corresponding to the elements in an active mode as shown in FIG. 2A, but the same principles may be used in a passive mode such as that in FIG. 2B (not shown).

In automatically/efficiently comparing behavior of two or more applications, one significant challenge is maintaining synchronization, for example maintaining lockstep between or among session states of two or more running instances of server software without disrupting the proper handling of dynamic values and identifiers significantly. Mapping dynamically generated values or identifiers ("IDs") so that requests from a complex multi-message network session continue to be meaningful for all running instances of the server software is disclosed. An identifier may be any object, class, identifier, and/or token, for example a session ID to identify any network communications/related message exchanges, a cross-site request forgery ("CSRF") token to reduce network communications malicious behavior, and/or an object used for authentication of any network communications, including a unique ID.

There are at least four ways to configure ID mappings:
1. Direct ID mapping—Listing each individual ID for each system;

2. ID Paths—JSON Pointer locations within a JSON document where IDs may be found;
3. ID Patterns—Regular expressions which identify a type or category of ID, for example UUIDs; and/or
4. Compound IDs—Regular expressions where each subexpression corresponds to an independent ID pattern, for example 'namespace:uuid'.

These configuration options may provide information necessary for the product to automatically learn every ID used by the application during a network session, and grant flexibility to adapt to different applications. Once a corresponding pair of IDs is learned, the comparator (202) may enforce the correspondence between them in future requests and reports on any defect/violation of that correspondence in future responses.

As an example of this learned ID mapping in action, consider a workflow as seen in FIG. 3A, comparing production (206) and staging/test (208) versions of an application.

Each running instance of the server software identifies itself by a unique systemId while providing access to resources labeled by a unique instanceId and allowing transactions which are identified by a transactionId.

Starting at a first workflow step (302), user (204) indicates they have a request for an application/server (206) with systemId "89785". Upon receiving this request for systemId "89785", the comparator (204) passes through in workflow step (304) this request to application (206) and also generates in workflow step (306) a duplicate request for the second application/server (208) with systemId "22233". Before the request (302) the comparator (204) is configured to map first application (206) systemId "89785" with second application (208) system Id "22233", and may use database/configuration document (203) to store the mapping.

The (302) request includes an access to resource with instanceId "DF453311-2" on application (206), and this also is mapped to a similar resource with instanceId "TS113188-3", conceptually shown in FIG. 3A as two boxed instanceIds linked with a dotted line.

The next workflow step (308) is the response from the first application (206) that includes reference to the instanceId "DF453311-2" with transaction with transactionId "XR66534", which may be compared by comparator (202) with the workflow step (310), the response from the second application (208) with reference to the instanceId "TS113188-3" with transaction with transactionId "ZC33321". That is, even though the mapped identifiers such as the instanceId and transactionId are different between the two responses (308), (310), the comparator (202) may provide a deeper comparison that accounts for the mapped identifiers. In this example the comparator (202) may learn a new ID mapping at this point between the newly created transactionId values.

In a future workflow step (314), a request/response that references a transaction, for example a close transaction, may be sent by the user (204) using the transactionId "XR66534" to refer to this transaction. The comparator (202) may use the previously learned mapping to use transactionId "XR66534" for the first application (206) and/or transactionId "ZC33321" to refer to this transaction for the second application (208). This may allow user operations to continue to function correctly when referencing the dynamically generated transactionIds referencing these coordinated transactions.

Existing test tools may be manually scripted to log in and find the systemId, instanceId, and transactionId values by looking at previous responses and sending the identifiers back in future requests. The comparator (202) may learn these identifiers as they traverse the network, allowing the corresponding identifiers to be intelligently handled.

When requests arrive referencing one of the learned identifiers, the comparator (202) may translate the message to remain meaningful to each instance of server software in order to maintain lockstep synchronization of the application state. A user/client may operate on a single set of identifiers provided by a single instance of the server software, say the first application (206), without any knowledge of the plurality of identifiers.

Figure 3B:
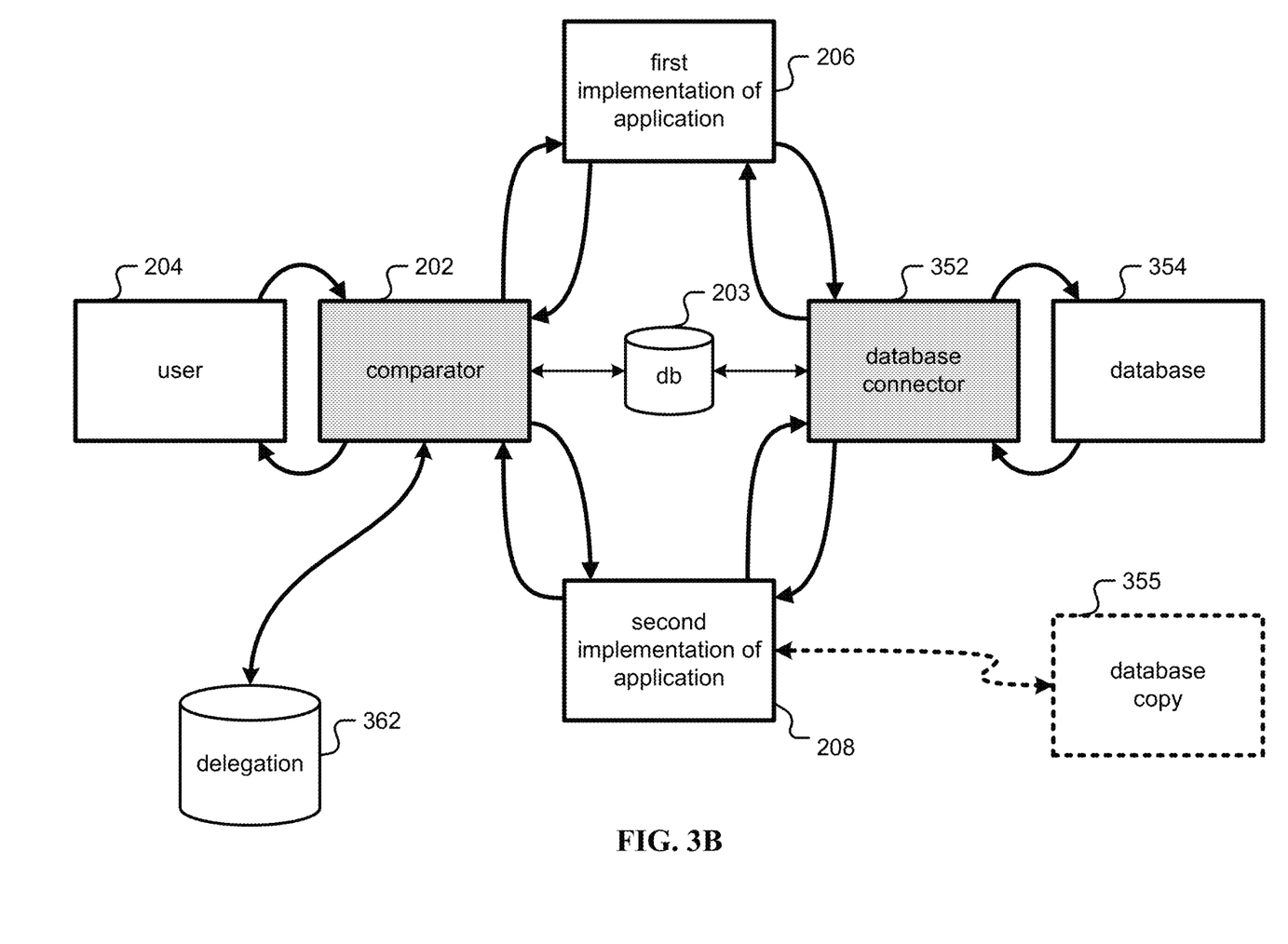
FIG. 3B is a block diagram illustrating an embodiment of a system for behavior-based comparison with a database.

FIG. 3B is a block diagram illustrating an embodiment of a system for behavior-based comparison with a database. Without limitation, for clarity mapping is shown in FIG. 3B corresponding to the elements in an active mode as shown in FIG. 2A, but the same principles may be used in a passive mode such as that in FIG. 2B (not shown).

Similar to that shown in FIG. 3A, user (204) is coupled to a first application (206), for example a production server, via a comparator (202), and may not be aware that they are also coupled to a second application (208), for example a release candidate. The comparator may use a database/configuration document (203) to aid in mapping of identifiers and other mapping.

In the event use of the application (206) uses an application database (354), there are at least two embodiments that are available to developers. Take an example where a user (204) requests a bank application (206), (208) transfer an amount of money from their bank account to a child's bank account. If both applications (206), (208) receive the money transfer request, there is a risk that the money is transferred twice.

In one embodiment, a database connector/mapper (352) may be used to map the database requests from the first application (206) to the application database (354), and reroute the database requests from the second application (208) to the same database connector (352) or alternately (not shown) a different database, a development/virtualized/validation environment for an application database, and/or a stub.

In one embodiment, the database connector (352) allows all queries from the first application (206) to execute directly against the application database (354). The database connector (352) matches the queries from the second application (208) against those sent from the first application (206). The database connector (352) duplicates the responses from the database (354) and provides identical responses to the matching queries from the second application (208). This embodiment allows both applications (206), (208) to effectively share a single application database (354) without duplicating the execution of queries against that database. In other words, the final state of the database (354) will be the same as if it had only been accessed by the first implementation (206). In one embodiment, the database connector (352) may use its own mapping database/configuration document (203), either the same one as the comparator (202) as shown, or a different database/document (not shown). In one embodiment, the database connector (352) uses at least one of the following: MySQL, PostgreSQL, MongoDB, and Redis.

In one embodiment, a copy of the application database (355) is made earlier and the second application (208) is associated with the database copy (355) while the first application (206) is associated with the database (354). The database connector (352) may be used in this case or the applications (206), (208) may otherwise be configured to use their respective databases (354), (355).

In one embodiment, authentication/credentials/mapping is configured using a delegation server (362). Examples of delegation protocols include Kerberos, OAuth, and Open ID Connect ("OIDC"). User credentials such as passwords may be sent to both applications (206), (208) for simple security systems. In more complex security environments where token/credentials are specific to a service, delegation protocols are used to take a user associated token for the first application (206) and request a user associated token for the second application (208) from the delegation server (362).

Figure 4:
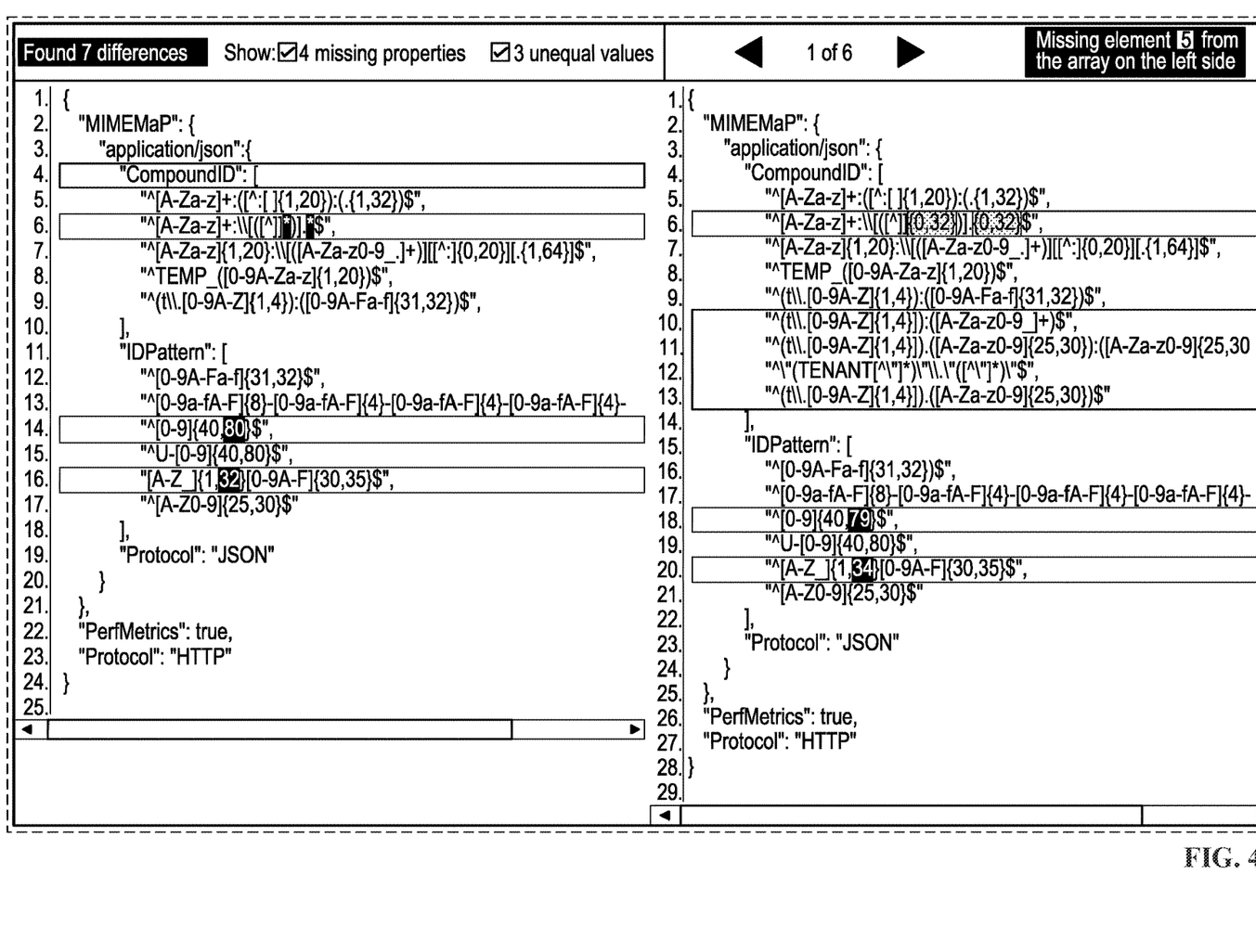
FIG. 4 is an illustration of a rendering of context-aware differences between network messages.

FIG. 4 is an illustration of a rendering of context-aware differences between network messages. In one embodiment, the rendering of FIG. 4 is shown to a developer of the system of FIG. 2A/FIG. 2B.

Differences in every response using a deep understanding of the protocol and structure of messages is explored. These differences show semantic or behavioral disagreement, as depicted in FIG. 4, between software servers which have been given inputs representing an identical sequence of operations. Thus, even unanticipated regressions or changes in behavior upon which network clients may rely may be easily, immediately, and/or proactively detected. In the example of FIG. 4, the comparator (202) has detected missing properties, unequal values, missing elements, and/or other differences.

An application's protocol interactions may thus be compared to assess upgrade performance and predict application behavior differences in multiple software versions, detecting disagreements in application semantics. The comparator (202) may be able to process encrypted TLS connections in order to monitor application behavior. A developer may configure which network ports may be used during connectivity, as well as which protocols are contained with the TLS payload. By configuring the appropriate certificate and key data, TLS connections may be secured and allow the comparator (202) to decrypt and process contained data for the purposes of intelligent comparison.

The comparator (202) may be flexible in that it may be deployed in several different scenarios with ease. One goal is to prevent business disruption and enable releasing at speed, exposing risk and improving quality before problems occur. The comparator (202) provides a level of testing to efficiently and automatically identify real world problems in real time. This may complement existing testing methods and may be a useful bridge for Continuous Integration and Continuous Delivery (CI/CD) processes. Real time behavioral feedback and a diagnostic overview give development, QA, and ops personnel some confidence and visibility to operate with precision.

Figure 5:
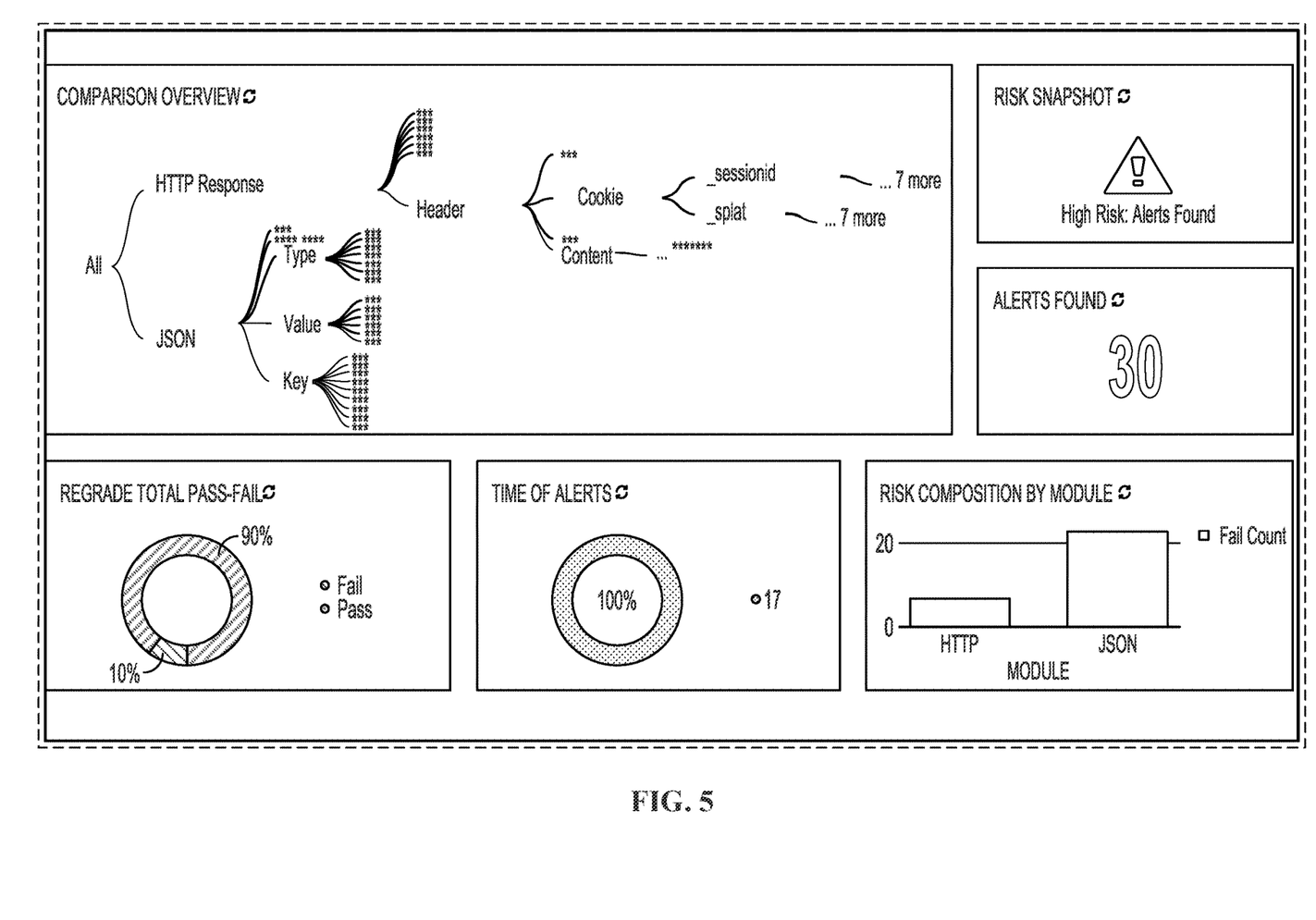
FIG. 5 is an illustration of a rendering of prioritized reporting.

FIG. 5 is an illustration of a rendering of prioritized reporting. In one embodiment, the rendering of FIG. 5 is shown to a developer of the system of FIG. 2A/FIG. 2B.

Having software that can intelligently monitor and record behavioral differences between software versions is enhanced with a viewer to these differences that is contextual and actionable. Differences at various application layers from HTTP to API level JSON objects may be tracked and reported with precision. Developers may view a high-level summary, contextual information about alerts, and/or a more detailed network packet capture containing granular information of what triggered the alert as shown in FIG. 5, where a high-risk alert has been found and a comparison overview has been shown. The comparator (202) may leverage a database, for example a Postgres database, to record anomalous behavior, and may categorize differences and prioritize significant events and context-specific activity. This may allow operators to quickly and efficiently review reports, drill down to see more detail, and/or adjust the configuration to match the application. Reports may be accessed from a management console and may also be exported in various formats for processing in external systems and workflows as needed.

The comparator (202) may also be used for intelligent comparison and logic may also be applied to standing up new servers or environments for any reason. These may be production systems prior to handling production traffic and/or internal development environments, and/or test labs prior to being used.

After servers are placed in production, expansive and deep application behavior validation may be performed when changing hosting providers, upgrading hardware, migrating database services, or making any changes to underlying architecture. This validation prevents non-qualified machines from going into service, and therefore saves time and avoids expensive corrections.

As the comparator (202) detects and reports differences in application behavior-based on deep protocol and communications analysis, it may determine whether a new environment has been misconfigured in a way that affects the application's operational performance.

In one embodiment, the comparator (202) is designed to be deployed easily in on-premises situations as well as cloud-based or virtual environments. The containerized solution may be packaged as either a containerized image such as a Docker image, or a virtualized package, such as a VM package, allowing it to be deployed easily into any environment, for example: Docker, Kubernetes, Cloud Foundry, Oracle Virtual Box, Microsoft Azure, Amazon Elastic Container Service and EC2, and/or VMWare. Configuration within each new environment may be achieved by using a management/UI console. Reports, analysis logs, and/or network packet capture data may also be accessed from this console.

Figure 6:
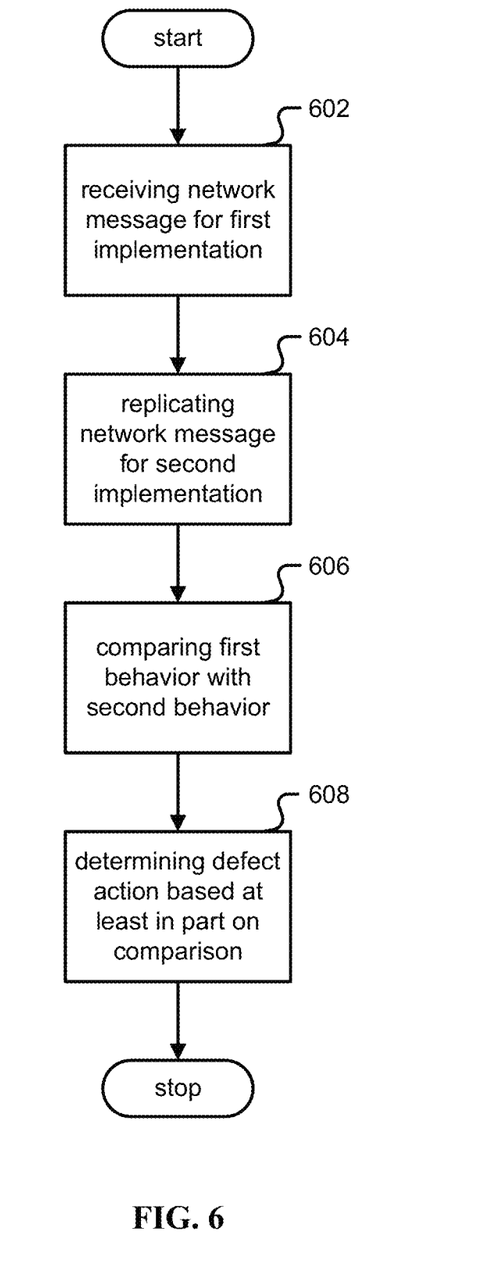
FIG. 6 is a flow diagram illustrating an embodiment of a process for behavioral comparison.

FIG. 6 is a flow diagram illustrating an embodiment of a process for behavioral comparison. In one embodiment, the process of FIG. 6 is carried out at least in part by the computer of FIG. 1, for example the comparator (202) of FIG. 2A or FIG. 2B.

In step (602), a network message is received for a first implementation. In step (604), the network message is replicated for a second implementation. For example, the first implementation and second implementation are versions of a same software system or the first implementation and second implementation are a same version of a software system.

In one embodiment, the network message is ordered for the first implementation; and wherein replicating comprises transmitting the network message in order to the second implementation. In one embodiment, ordering is at least one of the following: total ordering and partial ordering. In one embodiment, ordering is based on a global state or a connection state.

In one embodiment, an identifier mapping is configured; and wherein replicating comprises using the identifier mapping to dynamically map an identifier associated with the network message. In one embodiment, a user interface wizard is provided for determining recommendations on rules for dynamically mapping identifiers associated with the network message. In one embodiment, a user interface/packet capture and replay ability is provided for offline reproduceable test cases.

In one embodiment, configuring the identifier mapping comprises using at least one of the following: direct identifier mapping, identifier paths, identifier patterns, and compound identifiers. In one embodiment, replicating the network message for the second implementation uses at least one of the following: an active mode, and a passive mode. In one embodiment, automated delegation is provided using at least one of the following: OIDC, OAuth, and Kerberos. In one embodiment, a database connector (352) is configured using at least one of the following: MySQL, PostgreSQL, MongoDB, and Redis.

In step (606), a first behavior from the first implementation is compared with a second behavior from the second implementation. In one embodiment, a user sending the network message perceives a response from the first implementation and is not made aware of the second implementation.

In step (608), a defect action is determined based at least in part on the results of said comparison. For example, the first implementation is a stable version of a software system, the second implementation is a development version of the software system, and the defect action is a regressional test defect action. In one embodiment, determining comprises using consensus protocols with extra votes for ordering. In one embodiment, the defect action comprises showing semantic or behavioral disagreement, and/or prioritized reporting.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a processor configured to:
      receive a network message for a first implementation, comprising a first resource identifier;
      replicate the network message for a second implementation at least in part by using an identifier mapping to dynamically map the first resource identifier to generate a second mapped identifier;
      wherein the first implementation and second implementation are versions of a same software system;
      maintain lockstep and order between the first implementation and the second implementation at least in part by using the first resource identifier and the second mapped identifier;
      deep compare a first behavior from the first implementation with a second behavior from the second implementation that accounts for the second mapped identifier; and
      determine a defect action based at least in part on results of said comparison; and
   a memory coupled to the processor and configured to provide the processor with instructions.

2. The system of claim 1, wherein the processor is further configured to order the network message for the first implementation; and wherein replicating comprises transmitting the network message in order to the second implementation.

3. The system of claim 2, wherein ordering is at least one of the following: total ordering and partial ordering.

4. The system of claim 2, wherein ordering is based on a global state or a connection state.

5. The system of claim 1, wherein the processor is further configured to configure the identifier mapping.

6. The system of claim 5, wherein the processor is further configured to provide a user interface wizard for determining recommendations on rules for dynamically mapping identifiers associated with the network message.

7. The system of claim 5, wherein configuring the identifier mapping comprises using at least one of the following: direct identifier mapping, identifier paths, identifier patterns, and compound identifiers.

8. The system of claim 1, wherein a user sending the network message perceives a response from the first implementation and is not made aware of the second implementation.

9. The system of claim 1, wherein the first implementation and second implementation are a same version of a software system.

10. The system of claim 1, wherein the processor is further configured to provide a packet capture and replay facility for offline reproduceable test cases.

11. The system of claim 1, wherein the first implementation is a stable version of a software system, the second implementation is a development version of the software system, and the defect action is a regressional test defect action.

12. The system of claim 1, wherein determining comprises using consensus protocols with extra votes for ordering.

13. The system of claim 1, wherein replicating the network message for the second implementation uses at least one of the following: an active mode, and a passive mode.

14. The system of claim 1, wherein the processor is further configured to provide automated delegation using at least one of the following: OIDC, OAuth, and Kerberos.

15. The system of claim 1, wherein the processor is further configured to provide a database connector using at least one of the following: MySQL, PostgreSQL, MongoDB, and Redis.

16. The system of claim 1, wherein the defect action comprises showing semantic or oral disagreement.

17. The system of claim 1, wherein the defect action comprises prioritized reporting.

18. A method, comprising:
   receiving a network message for a first implementation, comprising a first resource identifier;
   replicating the network message for a second implementation at least in part by using an identifier mapping to dynamically map the first resource identifier to generate a second mapped identifier;
   wherein the first implementation and the second implementation are versions of a same software system;
   maintaining lockstep and order between the first implementation and the second implementation at least in part by using the first resource identifier and the second mapped identifier;
   deep comparing a first behavior from the first implementation with a second behavior from the second implementation that accounts for the second mapped identifier; and
   determining a defect action based at least in part on results of said comparison.

19. A computer program product embodied in a non-transitory computer readable medium and comprising computer instructions for:
   receiving a network message for a first implementation, comprising a first resource identifier;
   replicating the network message for a second implementation at least in part by using an identifier mapping to dynamically map the first resource identifier to generate a second mapped identifier;
   wherein the first implementation and the second implementation are versions of a same software system;

maintaining lockstep and order between the first implementation and the second implementation at least in part by using the first resource identifier and the second mapped identifier;

deep comparing a first behavior from the first implementation with a second behavior from the second implementation that accounts for the second mapped identifier; and determining a defect action based at least in part on results of said comparison.

* * * * *